United States Patent [19]

Nakai et al.

[11] Patent Number: 4,505,746

[45] Date of Patent: Mar. 19, 1985

[54] DIAMOND FOR A TOOL AND A PROCESS FOR THE PRODUCTION OF THE SAME

[75] Inventors: Tetsuo Nakai; Shuji Yazu, both of Itami, Japan

[73] Assignee: Sumitomo Electric Industries, Ltd., Osaka, Japan

[21] Appl. No.: 414,821

[22] Filed: Sep. 3, 1982

[30] Foreign Application Priority Data

| Sep. 4, 1981 | [JP] | Japan | 56-138644 |
| Dec. 2, 1981 | [JP] | Japan | 56-192772 |
| Jun. 2, 1982 | [JP] | Japan | 57-95104 |
| Jul. 19, 1982 | [JP] | Japan | 57-124512 |

[51] Int. Cl.$^3$ ............................ B22F 7/02; B24D 3/02
[52] U.S. Cl. ............................ 75/243; 75/236; 75/238; 75/240; 75/242; 75/244; 419/6; 419/11; 419/12; 419/13; 419/14; 419/15; 76/DIG. 12
[58] Field of Search ............... 51/307, 309; 76/107 A, 76/DIG. 12; 75/240, 241, 243, 244, 242, 246, 236, 238, 239; 419/5, 6, 11, 14, 15

[56] References Cited

U.S. PATENT DOCUMENTS

| 2,731,711 | 1/1956 | Lucas . | |
| 3,000,087 | 9/1961 | Dyer | 75/240 |
| 4,231,762 | 11/1980 | Hara et al. | 51/307 |
| 4,303,442 | 12/1981 | Hara et al. | 75/243 |
| 4,370,149 | 1/1983 | Hara et al. | 51/307 |

Primary Examiner—Ben R. Padgett
Assistant Examiner—Anne Brookes
Attorney, Agent, or Firm—Wenderoth, Lind & Ponack

[57] ABSTRACT

An improved diamond compact of the present invention comprises 20 to 85% by volume of diamond grains with a grain size of at least 3 μm and the balance of a binder consisting of 20 to 95% by volume of ultra-fine diamond grains with a grain size of at most 1 μm, at least one member with a grain size of at most 1 μm, selected from the group consisting of carbides, carbonitrides, nitrides, borides of Group 4a, 5a and 6a elements of Periodic Table, solid solutions thereof and mixed crystals thereof and at least one member selected from the group consisting of iron group metals.

35 Claims, 12 Drawing Figures (A)

30 μm (B)

30 μm (A)

X30

(B)

X500

(A)

X30

(B)

X500

DIAMOND FOR A TOOL AND A PROCESS FOR THE PRODUCTION OF THE SAME

BACKGROUND OF THE INVENTION

1. Field of the Invention

This invention relates to a diamond sintered body or compact for tools and a process for the production of the same, and more particularly, it is concerned with a diamond sintered body or compact for tools, comprising coarse diamond grains and a binder containing ultra-fine diamond grains and a process for the production of the same.

2. Description of the Prior Art

At the present day, diamond compacts containing more than 70% by volume of diamond have commercially been sold for wire-drawing dies or cutting tools of nonferrous metals, plastics or ceramics. Above all, fine diamond grain compacts are favourably commented because when using as a die for drawing a relatively soft wire rod such as copper wire, there is obtained a wire with a very smooth surface after drawn thereby. However, no one has developed a diamond compact with satisfactory properties for drawing a high hardness wire rod such as brass-plated high carbon steel wire. In the case of using these commercially sold diamond compacts as cutting tools of ceramics or drill bits, a compact consisting of fine diamond grains has a problem as to wear resistance and a compact consisting of coarse diamond grains tends to be broken to such an extent that the reuse be impossible. Other tool materials comprising the above described diamond compact part bonded to a substrate of cemented carbide have also been marketed and favourably commented, in particular, as a cutting tool of Al-Si alloys or high hardness Cu alloys in spite of their higher prices.

The inventors have made studies on the properties of these tool materials and have found that these materials comprise as a predominant component diamond crystals contacted with each other to form a skeleton structure having a more excellent wear resistance than the commonly used cemented carbides. However, it is also found that these excellent diamond compacts, on the other hand, have various disadvantages. The first disadvantage is that the price is too high though the wear resistance is very excellent, and moreover, regrinding involves also great expense. Because of the high price, even the insert worn once cannot be thrown away without regrinding, while inserts of cemented carbides are ordinarily of throw-away type. When an insert of diamond compact is subjected to a regrinding test based on this thought, this seems rather to dress a diamond wheel used therefor than to grind the insert. That is, the regrinding efficiency is very low and the consumption of the diamond wheel is very large.

The second disadvantage is that when a nonferrous alloy is subjected cutting and the worked surface is observed, for example, the surface roughness is not so fine as using a cutting tool of natural diamond single crystal and no one finds a beautiful finished surface called mirror surface. In addition, when small articles such as watch parts or thin workpieces are subjected to cutting, problems arise that the cutting resistance is too large to hold the dimensional precision and the workpieces tend to be deformed. In the commercially sold diamond compacts, as set forth above, diamond crystals are contacted with each other to form a skeleton structure and there is cobalt among diamond grains with a grain size of 3-8 $\mu$m. When the edge of a cutting tool using this compact is observed, there is found roughness substantially corresponding to the size of the crystal grains. This is considered to be one reason why a beautiful finished work surface is hardly obtained. Furthermore, the metallic Co binder phase present among diamond grains tends to adhere to a workpiece metal, which is a problem, in particular, in a case where a finished work surface like mirror surface is required.

In order to solve these problems, one of the inventors has developed and proposed a compact with a decreased content of diamond grain and a compact consisting of diamond grains with a size of less than 1 micron (U.S. Pat. Nos. 4,171,973 and 4,303,442). These compacts are surely improved in workability to be ground as well as in edge sharpness, but it is found that they show some drawbacks as to wear resistance and adhesivity resistance depending upon the variety of workpieces.

SUMMARY OF THE INVENTION

It is an object of the present invention to provide a diamond compact useful for drawing high hardness wire rods, for cutting ceramics and as a drill bit, whereby the above described disadvantages of the prior art can be overcome.

It is another object of the present invention to provide a diamond compact or diamond sintered body for tools excellent in wear resistance as well as in toughness.

It is a further object of the present invention to provide a diamond compact suitable for use as a drill bit and a die for drawing a high hardness wire rod.

It is a still further object of the present invention to provide a process for the production of the above described diamond compacts.

It is a still further object of the present invention to provide a tool consisting of the above described diamond compact supported by a supporting member.

These objects can be attained by a diamond compact for a tool, comprising 20 to 85% by volume of diamond grains with a grain size of 3 $\mu$m or more and the balance of a binder consisting of 20 to 95% by volume of ultra-fine diamond grains with a grain size of 1 $\mu$m or less, at least one member with a grain size of 1 $\mu$m or less, selected from the group consisting of carbides, nitrides, carbonitrides, borides of Group 4a, 5a and 6a elements of Periodic Table, solid solutions thereof and mixed crystals thereof and at least one member selected from iron group metals, and a process for the production of the above described diamond compact for a tool, which process comprises preparing a mixture comprising a diamond powder with a grain size of 3 $\mu$m or more, an ultra-fine diamond powder with a grain size of 1 $\mu$m or less, at least one member with a grain size of 1 $\mu$m or less, selected from the group consisting of carbides, nitrides, carbonitrides, borides of Group 4a, 5a and 6a elements of Periodic Table, solid solutions thereof and mixed crystals thereof and at least one member selected from iron group metals and then hot pressing the mixture at a high temperature and high pressure at which diamond is stable using an ultra-high pressure and high temperature apparatus.

BRIEF DESCRIPTION OF THE DRAWINGS

The accompanying drawings are to illustrate the principle and merits of the present invention in more detail.

DETAILED DESCRIPTION OF THE INVENTION

The inventors have made efforts to develop a material capable of being ground well or giving an edge of sharpness and excellent in wear resistance and adhesivity resistance and consequently, have found that this can be accomplished by a compact comprising 20 to 85% by volume of diamond grains with a grain size of at least 3 μm, preferably at least 10 μm and the balance of a binder consisting of 20 to 95% by volume of ultrafine diamond grains with a grain size of at most 1 μm, carbides, nitrides, carbonitrides or borides of Group 4a, 5a or 6a elements of Periodic Table, or solid solutions thereof or mixed crystals thereof, and iron group metals such as iron, cobalt and nickel. These carbides, nitrides, carbonitrides, borides, or solid solutions or mixtures have a grain size of at most 1 μm, preferably 0.5 μm and are generally in a proportion by weight of at least 50% to the iron group metal. In particular, a proportion of the carbide and iron group metal is such that the content of the carbide is more than that corresponding to the eutectic composition.

Figure 1:
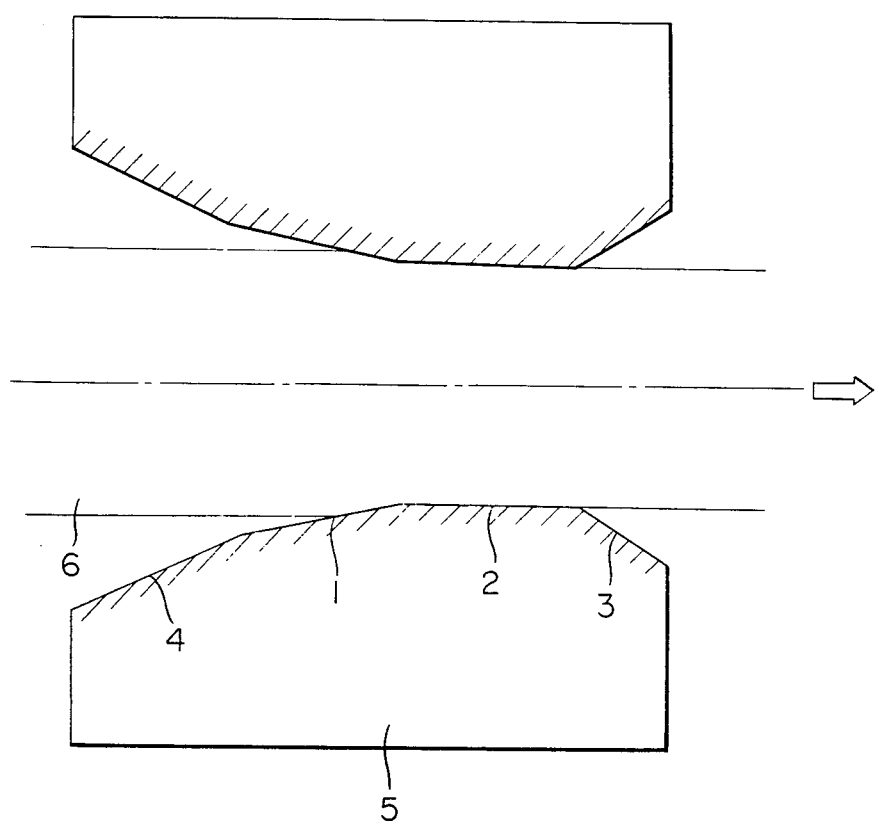
FIG. 1 is a schematic view of the contact state of a die with a wire rod during drawing.

To examine the cause that satisfactory performances are not shown when a high strength wire rod is drawn by a commercially sold diamond compact, dies are prepared using three diamond compacts of a grain size of 30-60 μm, 2-6 μm and at most 1 μm and subjected to drawing of brass-plated steel wires. Observing the wire surface and die inner surface, the inner surface of any die is longitudinally scratched and roughened and the scratches are transferred to the surface of the drawn wire. The scratches have a size of about 1 to 3 μm and are very deep. Formation of the scratches on the inner surface of the die is assumed as follows. In any of the diamond compacts used, diamond grains are coherently bonded with each other to form a diamond skeleton, but in the diamond compact with a grain size of 30 to 60 μm, the edges of diamond grains or diamond skeleton part are seemingly broken and fall off at reduction portion 1 where the wire and die are firstly contacted as shown in FIG. 1, thus scratching the inner surface of the die. In the case of the diamond compact with a grain size of 2-6 μm, it is assumed that diamond grains of about 2 μm are rather fallen off to scratch the inner surface than breakage of the diamond skeleton at reduction portion 1. On the other hand, it is assumed that the compact consisting of diamond grains with a grain size of at most 1 μm meets with falling-off of each of diamond grains and mass of several diamond grains, which form fine scratches and large scratches on the die inner surface, thereby scratching the wire surface.

The reason why the prior art diamond compacts are not useful is that the inner surface of a die is scratched due to breakage of the diamond skeleton part and to falling-off of the diamond grains and the scratches are transferred to the surface of a wire. The cause of breakage of the diamond skeleton part and falling-off of the diamond grains will now be considered.

In wire drawing, the inner surface of a die is loaded with normal force and frictional force by a wire rod. Ordinarily, when normal force and frictional force act between solid contact surfaces there are generated shear stress and principal stress, Referring to FIG. 1, on the inner surface of die 5, the maximum principal stress is generated at the contact point of wire rod 6 and die 5 in reduction part 1 and the maximum shear stress is generated near the point of intersection of back relief part 3 and bearing part 2 that wire rod 6 leaves. 4 shows an approach part. When drawing a high strength wire rod, in particular, the normal force and frictional force are increased, resulting in increase of the maximum principal stress and maximum shear stress. The diamond skeleton part of a diamond compact, containing impurities such as catalytic metals, is the weakest part in strength of the compact. When a principal stress or shear stress is added to this part, therefore, a concentrated stress is loaded on the impurity-containing site of the skeleton. In reduction part 1, in particular, a repeated stress is added with change of the contact part with wire rod 6 and cracks develop leading to breakage.

In the case of a compact of diamond grains with a larger grain size, e.g. of 30-60 μm, the maximum principal stress is generated near the surface of reduction part 1 as described above, so the skeleton part round diamond grains is not broken, but only the skeleton part near the surface layer is broken and falls off. Large diamond grain itself hardly falls off. On the other hand, in the case of a diamond compact with a grain size of 2 to 6 μm or at most 1 μm, the skeleton part is small too because of the smaller diamond grains and even if the skeleton part is broken and fallen off, there are few scratches on the inner surface of a die. However, all the skeletons around diamond grains are broken and thus one or more diamond grains often fall off in the form of a mass, resulting in large scratches on the inner surface.

In order to overcome the disadvantages of the prior art diamond compacts as described above, it is required not only to prevent diamond grains from falling off, but also to prevent large breakage at diamond skeleton parts. To prevent diamond grains from falling off, use of diamond grains having a grain size of more than several μm is favourable as described above, but since the presence of a large diamond skeleton results in breakage of the skeleton, it is necessary to choose a material which does not form a large diamond skeleton. If a binder has an inferior adhesive property to diamond, diamond grains tend to fall off even by the use of diamond grains with a grain size of more than several μm. When using a binder inferior in wear resistance, on the other hand, only the binder part wears first of all and diamond grains fall off during drawing. Therefore, the requirements as a binder are an excellent adhesive property to diamond and a high wear resistance. Furthermore, it is desirable to use a material having a smaller zone of skeleton part relatively tending to fall off.

Various materials have been made on an experimental basis in view of the above described problems and studied and consequently, it is found that a compact is capable of exhibiting good performances, which comprises diamond grains with a grain size of 3 μm or more, preferably 10 μm or more, and a binder consisting of diamond grains with a grain size of 1 μm or less, preferably 0.5 μm or less, grains with a grain size of 1 μm or less of carbides, nitrides, carbonitrides or borides of Group 4a, 5a or 6a elements of Perriodic Table, solid solutions thereof or mixed crystals thereof, and an iron group metal.

Since the binder used in the compact of the present invention consists of fine grains having a grain size of 1 μm or less, no skeleton among large diamond grains is formed, nor the inner surface of a die is scratched due to breakage and falling-off of diamond skeletons. It is assumed that diamond grains do not fall off because the diamond grains are bonded with diamond grains with a grain size of at most 1 μm contained in the binder and the affinity of carbides, nitrides, carbonitrides or borides of Group 4a, 5a or 6a of Periodic Table or iron group metals such as Fe, Ni and Co to diamond is excellent. In addition, the binder contains fine diamond grains having a grain size of 1 μm or less and the wear resistance of the binder is excellent, so the binder does not meet with abnormal abrasion during drawing. When the compact of the present invention is worked into a die, the wear resistance of the binder part is excellent but inferior to that of coarse diamond grains with a grain size of 10 μm or more, and the binder part becomes somewhat depressed in comparison with the coarse diamond grains. When wire drawing is carried out under this state, the load on the diamond part is increased but that on the binder part is decreased. Accordingly, the fine diamond grains in the binder part do not fall off as several masses, nor the inner surface of a die is scratched.

The above described diamond compact of the present invention is generally produced by preparing a mixture of diamond powder with a grain size of at least 3 μm, ultra-fine diamond powder with a grain size of at most 1 μm, at least one member with a grain size of at most 1 μm, selected from the group consisting of carbides, nitrides, carbonitrides and borides of Group 4a, 5a and 6a of Periodic Table, and at least one member selected from the iron group metals and hot pressing the resulting mixed powder at a temperature and pressure at which diamond is stable and at a temperature of at least 1200° C. and a pressure of at least 45 kbar using an ultra-high pressure and high temperature apparatus. For example, the coarse diamond powder has a grain size of at least 10 μm and is mixed in proportion of 20–85% by volume, and the ultra-fine diamond powder has a grain size of at most 0.5 μm with the carbides, nitrides, carbonitrides and borides.

In the compact of the present invention, the grain size of diamond is at least 3 μm and the upper limit is not particularly limited but is generally at most 1 mm. Such diamond grains amount to 20 to 85% by volume, in particular, 50 to 70% by volume. The grain size of diamond grains in the binder is generally at most 1 μm, preferably at most 0.5 μm, the lower limit being about 0.1 μm and such diamond grains amount to 20 to 95% by volume, in particular, 50 to 80% by volume in the binder material.

In the compact of the present invention, the proportion of carbides of Group 4a, 5a and 6a elements of Periodic Table and iron group metals used as components of the binder is generally such that the content of the carbide is more than corresponding to the eutectic composition.

Figure 2:
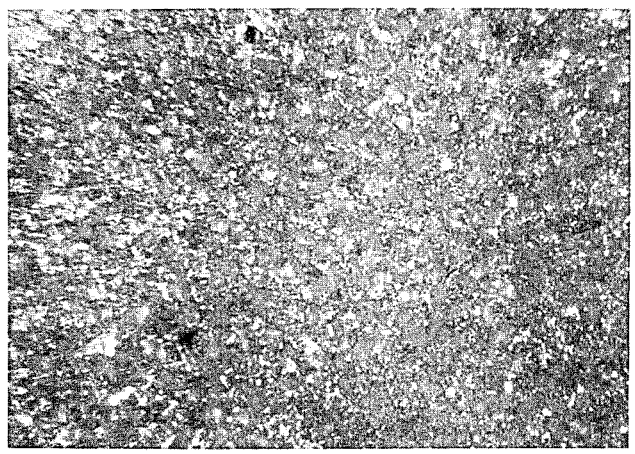
FIG. 2 is a micrograph showing the structure of the compact according to the present invention (magnification: 1500 times).
Figure 3:
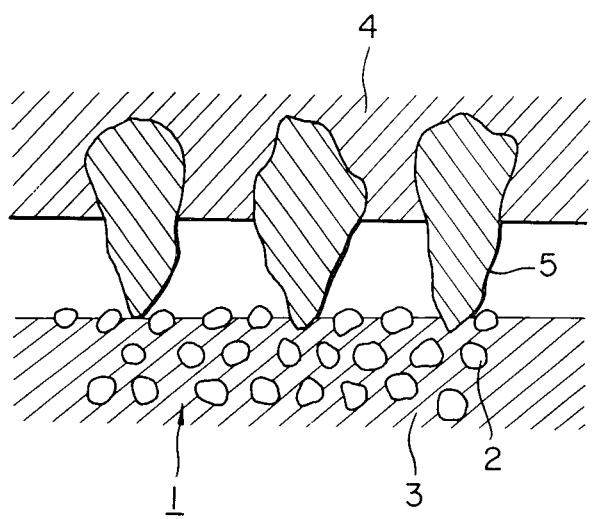
FIG. 3 is a schematic view to illustrate the mechanism of ginding the tool of the present invention by a diamond wheel.

FIG. 2 is a micrograph showing a typical structure of the compact of the present invention, in which there are diamond grains with a grain size of at most 1, grains of carbides, nitrides, carbonitrides or borides of Group 4a, 5a or 6a elements of Periodic Table and an iron group metal, as a binder, around diamond grains with a grain size of at least 3 μm. When grinding this compact, sharp edges of diamond grinding wheel are contacted with the compact as shown in FIG. 3, but since the compact has the binder parts that can more readily be ground than diamond crystal, it will exhibit a more improved workability to be ground than a compact in which diamond crystals of 3 μm or more form skeletons. Referrint to FIG. 3, 1 is tool material, 2: diamond grains, 3: binder containing ultra-fine diamond grains, 4: grindstone and 5: diamond crystals in grindstone.

The reason why the cutting edge sharpness of the compact according to the present invention is excellent is considered as follows. In the commercially sold compact comprising diamond grains of 3 to 8 μm and a binder of Co, the diamond grains forming a skeleton structure, the binder of Co is readily removed to retain roughness substantially corresponding to the size of the crystal grains of the edge, while in the compact of the present invention, the binder contains fine diamond grains and accordingly, it is hot removed so as in the case of using Co as a binder, thus forming a part of the edge. Thus, the edge has little roughness and exhibits an excellent cutting edge sharpness.

Figure 4:
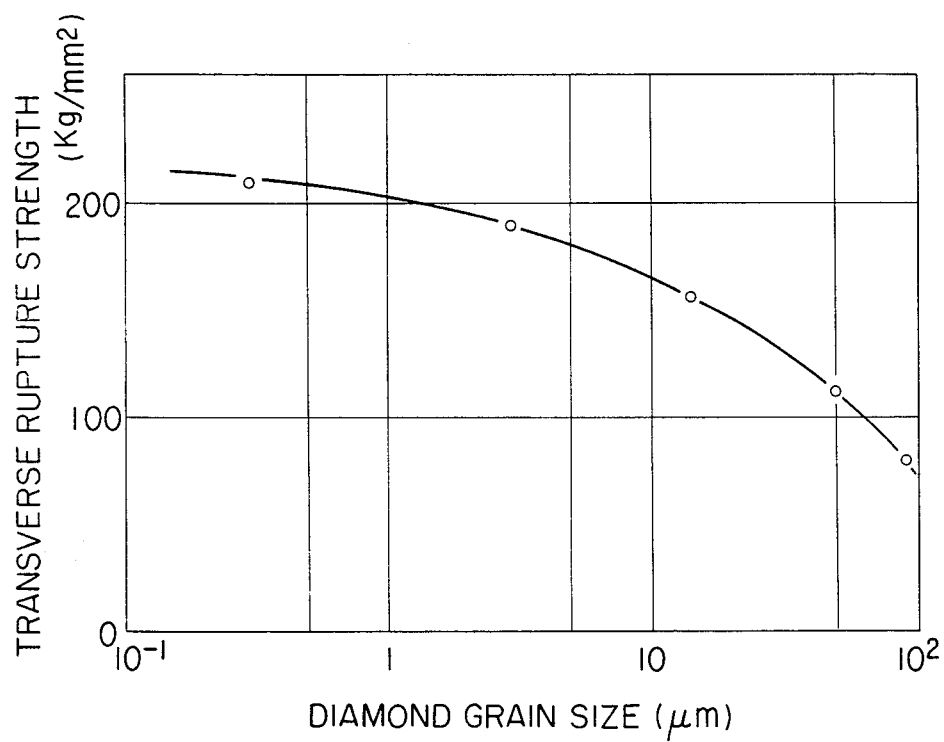
FIG. 4 is a graph showing the relationship between the transverse rupture strength and grain size of a diamond compact.

The strength of a diamond compact is lowered with the increase of the grain size of diamond grains as shown in FIG. 4. A compact of fine diamond grains is so excellent in transverse rupture strength as well as in toughness that the edge is not broken, but since individual grains are held by small skeletons and their bonding strengths are weak, the individual grains tend to fall off during cutting, resulting in a lower wear resistance. On the other hand, in a compact of coarse diamond grains held by large skeletons, individual diamond grains have a high bonding strength to give an excellent wear resistance, but cracks once formed tend to be propagated due to the large skeleton parts, thus leading to breakage of the edge.

In this embodiment of the present invention, diamond grains having a grain size of 3 to 10 μm are held by ultra-fine diamond grains, whereby to give a good wear resistance of the diamond grains having a grain size of 3 to 10 μm and a high toughness of the ultra-fine diamond grains. Since the compact of the present invention contains ultra-fine diamond grains and carbides, nitrides or carbonitrides of Group 4a, 5a or 6a elements of Periodic Table, the adhesivity resistance is very excellent.

The grain size of coarse diamond grains used in this embodiment should be 3 μm or more. If less than 3 μm, some problems arise on wear resistance. In the use as cutting tools for nonferrous metals, it is desirable for obtaining a similar worked surface finish to single crystal diamond to hold the grain size of diamond grains in the range of 3 to 10 μm. If more than 10 μm, the roughness of a worked surface and the workability to be ground are deteriorated. Diamond grains with a grain size of 3 to 10 μm are preferably in a proportion of 20 to 85% by volume. Where a higher wear resistance is required, it is necessary to increase the content of diamond grains with a grain size of 3 to 10 μm, but if the content exceeds 85% by volume of the compact, the workability to be ground is deteriorated and the edge tends to be broken during cutting. On the other hand, if the content is less than 20% by volume, a problem of wear resistance arises.

The ultra-fine diamond grain in the binder has a grain size of 1 μm or less, preferably 0.5 μm or less. If the grain size of the fine diamond grains exceeds 1 μm, the workability and toughness are lowered. The content of fine diamond grains in the binder is preferably 20 to 95% by volume, since if less than 20% by volume, the wear resistance of the binder phase is lowered, the binder phase is scraped during grinding, no sharp edge is obtained or the binder phase is early worn during cutting so that diamond grains of 3 μm or more fall off, while if more than 95% by volume, the binder material becomes brittle or diamond grains of 1 μm or less grows to lower the toughness, because the content of carbides, nitrides or borides of Group 4a, 5a or 6a elements of Periodic Table is decreased. In addition, the compact of the present invention is excellent in toughness and is thus effective for interrupted cutting of nonferrous metals.

In the case of using the compact of the present invention, in particular, as a wire drawing die, the grain size of diamond grains is preferably 10 μm or more. If less than 10 μm, diamond grains fall off to scratch the inner surface of a die. The content of diamond grains with a grain size of 10 μm or more is preferably in the range of 20 to 85% by volume. If the content of diamond grains with a grain size of 10 μm or more is less than 20% by volume, the binder is increased, the load to be loaded by the binder is increased and the diamond grains in the binder fall off in the form of several masses to scratch the inner surface of a die. If more than 85% by volume, diamond grains with a grain size of 10 μm or more are brought into contact with each other to form a large diamond skeleton and during wire drawing, this part is broken and allowed to fall off to scratch deeply the inner surface of a die. If the grain size of fine diamond grains in the binder exceeds 1 μm, the inner surface of a die is scratched deeply in the case of falling off and uniform distribution thereof in the binder is hard to obtain, The grain size should be generally 1 μm or less, preferably 0.5 μm or less on the average. The content of fine diamond grains should be 20 to 95% by volume of the binder, since if less than 20% by volume, the wear resistance of the binder is inferior, resulting in early wearing and falling-off of the diamond grains, while if more than 95% by volume, the binder becomes brittle or the content of carbides, nitrides, borides etc. of Group 4a, 5a or 6a elements of Periodic Table is decreased, so the diamond grains of 1 μm or less grow and the object of the present invention can not be obtained. Grain growth of fine diamond grains is carried out at a high temperature and high pressure at which diamond is stable in the presence of a liquid phase of iron group metal capable of dissolving diamond. This grain growth is due to the dissolving and precipitating phenomenon. The most effective means for the inhibition of this grain growth is to add a fine powder of carbides, nitrides, carbonitrides or borides of Group 4a, 5a or 6a elements of Periodic Table as proposed by the inventors. Of the carbides of Group 4a, 5a and 6a elements of Periodic Table, in particular, WC or (Mo, W)C having the same crystal system as WC exhibits the largest effect of inhibiting grain growth.

The inventors have examined the reason why commercially sold diamond compacts are not suitable for cutting ceramics or rock drilling. Cutting tools are made of commercially sold diamond compacts differing in grain size and used for cutting granite. As a result, it is found that a compact consisting of fine diamond grains having a grain size of 1 μm or less has some problems and an edge made of the compact becomes round at the initial period of cutting. On the other hand, if the grain size of diamond grains is coarser, e.g. 10 μm or more, an edge tends to be broken during cutting although the wear resistance is excellent, because it is assumed that the transverse rupture strength of a diamond compact is lowered with increase of the grain size. A compact of fine diamond grains is so excellent in transverse rupture strength as well as in toughness that the edge is not broken, but since individual grains are held by small skeletons and their bonding strengths are weak, the individual grains tend to fall off during cutting, resulting in a lower wear resistance. On the other hand, in a compact of coarse diamond grains held by large skeletons, individual diamond grains have a high bonding strength to give an excellent wear resistance, but cracks once formed tend to be propagated due to the large skeleton parts, thus leading to breakage of the edge. Diamond compacts which can be applied to the above described use should be excellent in wear resistance and should have a high toughness. Based on the consideration that a compact combining the excellent wear resistance of a coarse grain diamond compact with the high toughness of a fine grain diamond compact can be realized by using the same material as that of the diamond compact for dies, the composition of a compact is studied as follows.

Consequently, it is found that a compact can satisfy the above described requirements, which comprises 20 to 85% by volume of diamond grains with a grain size of 10 μm or more and the balance of a binder consisting of 20 to 95% by volume of diamond grains with a grain size of 1 μm or less, at least one member with a grain size of 1 μm or less, selected from the group consisting of carbides, carbonitrides, nitrides, borides of Group 4a, 5a and 6a elements of Periodic Table, solid solutions thereof and mixed crystals thereof and at least one member selected from iron group metals. The compact of this embodiment, containing diamond grains with a grain size of 10 μm or more, has a very excellent wear resistance. Where a wear resistance is particularly required it is desirable to increase the content of diamond grains with a grain size of 10 μm or more, but if the content thereof exceeds 85% by volume of the compact, the edge tends to be broken. Where a toughness is required, it is desirable to decrease the content of diamond grains with a grain size of 10 μm or more, but if the content is less than 20% by volume, a problem of wear resistance takes place. If the grain size of coarse diamond grains is less than 10 μm, the wear resistance is lowered and accordingly, a grain size of 10 μm or more is preferable. The grain size of fine diamond grains is generally 1 μm or less, preferably 0.5 μm or less. If the grain size of fine diamond grains exceeds 1 μm, the toughness is lowered. The content of fine diamond grains in a binder is preferably 20 to 95% by volume. If the content of fine diamond grains is less than 20% by volume, the wear resistance of binder phase is lowered and the binder phase is worn early to allow the coarse diamond grains to fall off. If the content of fine diamond grains exceeds 95% by volume, on the other hand, the binder becomes brittle or diamond grains of 1 μm or less grow to lower the toughness because of decrease of the content of carbides, nitrides, carbonitrides or borides of Group 4a, 5a or 6a elements of Periodic Table.

In order to examine the cause that satisfactory performances are not given when commercially sold diamond compacts are used as a drill bit, andesite is subjected to cutting using three diamond compacts of a grain size of at most 1 μm, 30-60 μm and 80-100 μm. As a result of this test, it is found that the diamond compact of at most 1 μm does not meet with breakage of the edge, but shows a large quantity of wearing, while both of the diamond compacts of 30-60 μm and 80-100 μm meet with breakage of the edges at the initial stage. The cause of this phenomenon can be assumed as follows. The strength of a diamond compact is lowered with increase of the grain size as shown in FIG. 4. A compact of fine diamond grains is so excellent in transverse rupture strength as well as in toughness that the edge is not broken, but since individual grains are held by small skeletons and their bonding strengths are weak, the individual grains tend to fall off during cutting, resulting in a lower wear resistance. On the other hand, in a compact of coarse grains held by large skeletons, individual diamond grains have a high bonding strength to give an excellent wear resistance, but cracks once formed tend to be propagated due to the large skeleton parts, thus leading to breakag of the edge. Diamond compacts which can be applied to the above described use should be excellent in wear resistance and should have a high toughness.

The inventors have made efforts to develop a diamond compact excellent in wear resistance and toughness and consequently, have found that a compact combining the excellent wear resistance of a course grain diamond compact with the high toughness of a fine grain diamond compact comprises diamond grains with a grain size of 10 to 100 μm and a binder containing ultra-fine diamond grains with a grain size of at most 1 μm, WC powder or (Mo, W)C having the same crystal structure as WC with a grain size of at most 1 μm, an iron group metal and optionally a very small quantity of boron or boron-containing compounds. This embodiment of the present invention is based on this finding.

Figure 6:
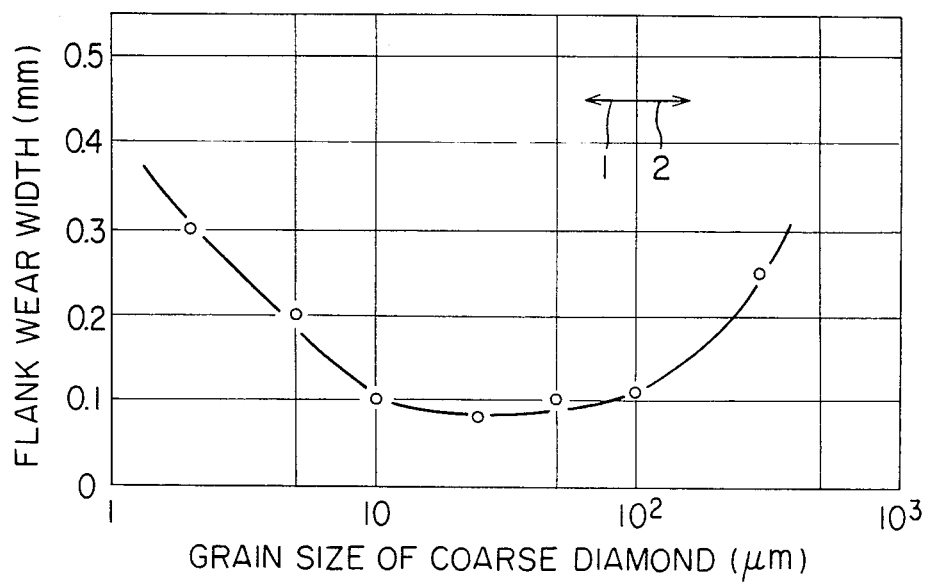
FIG. 6 is a graph showing the relationship between the rock cutting performance and the grain size of coarse diamond grains in the compact of the present invention.
Figure 7:
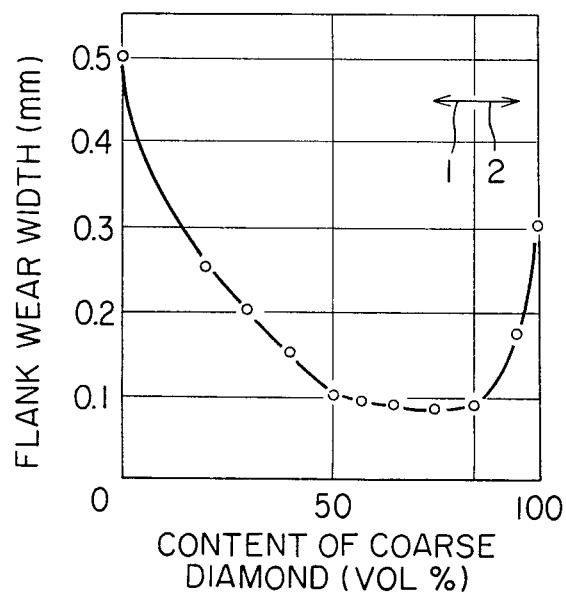
FIG. 7 is a graph showing the relationship between the rock cutting performance and the content of coarse diamond grains.

To seek the optimum composition of the above described material, the inventors have made on an experimental basis diamond compacts varying the grain size and content of coarse diamond grains and the content of diamond grains with a grain size of at most 1 μm contained in the binder and then subjected these samples to cutting tests of andesite. The results are shown in FIG. 6 and FIG. 7 in which 1 indicates normal wearing zone and 2 indicates edge breakage zone. If the grain size of coarse diamond grains is less than 10 μm, the wear resistance is lowered and if more than 100 μm, cracks are formed in diamond grains during sintering, resulting in breakage of the edge and increase of the wear quantity. The content of coarse diamond grains is preferably 50 to 85% by volume, since if the content of coarse diamond grains is less than 50% by volume, a binder containing fine diamond grains is increased and the wear resistance is thus lowered, while if more than 85% by volume, coarse diamond grains are bonded with each other and the toughness is thus lowered. The grain size of fine diamond grains in the binder is preferably at most 1 μm, more preferably 0.5 μm. If the grain size of fine diamond grains exceeds 1 μm, the toughness is lowered. The content of fine diamond grains in the binder is preferably 60 to 90% by volume, since if the content of fine diamond grains is less than 60% by volume, the wear resistance of binder phase is lowered and the binder phase is worn early to allow the coarse diamond grains to fall off, while if more than 90% by volume, the binder becomes brittle or diamond grains of 1 μm or less grow to lower the toughness because of decrease of the content of WC or (Mo, W)C having the same crystal structure as WC.

In particular, when 0.005 to 0.15% by weight of boron or boron-containing compounds such as $TiB_2$, $ZrB_2$, $B_4C$ or the like is incorporated in the compact according to this embodiment of the invention, the performances are remarkably improved. Diamond grains are ordinarily sintered at an ultra-high pressure and high temperature by the dissolving and precipitating phenomenon of diamond in the presence of a catalyst such as iron group metals. The effect of adding boron or borides is possible due to that an iron group metal boride is formed and the dissolving and precipitating speed is increased, thus allowing to grow the bonded parts of diamond grains each other (diamond skeleton part) and increasing the retention of diamond grains. If the content of boron or borides is less than 0.005%, formation of diamond skeleton parts is slow, while if more than 0.15%, a large quantity of boron enters the diamond skeleton parts to lower the strength thereof.

The compact of the present invention is so excellent in toughness that it is also useful for interrupted cutting of nonferrous metals. Where a good surface roughness is required, in particular, it is effective to reduce the grain size of diamond grains, but if the grain size is less than 3 μm, a problem of wear resistance arises sometimes depending upon the variety of workpieces to be cut. In such a use, therefore, it is preferable that diamond grains as the binder component have a grain size of at most 1 μm and diamond grains as the wear resisting component have a grain size of at least 3 μm.

As the raw materials for the compact of the present invention, there are used diamond grains having a grain size of 3 μm or more and diamond grains having a grain size of 1 μm or less, preferably 0.5 μm or less. Any of synthetic diamond and natural diamond can be used.

These diamond powders are uniformly mixed with at least one of the above described compound powders and at least one of iron group metal powders by ball milling. The iron group metal can be dissolved during sintering instead of mixing at this stage. Furthermore, diamond powders can be mixed with the compound powder and iron group metal powder by ball milling using a pot and balls made of a sintered body of the compound powder and iron group metal powder, as previously proposed in our prior patent application (Japanese Patent Application No. 51381/1977). The mixed powers are charged in an ultra-high pressure apparatus and sintered under conditions at which diamond is stable. During the same time, it is necessary to effect the sintering at a temperature at which eutectic liquid phase between the compound such as carbides and the iron group metal used appears, or at a higher temperature. In the case of using TiC as the compound and Co as the iron group metal, for example, liquid phase appears at a temperature of about 1260° C. under normal pressure. Under higher pressures, this eutectic temperature is considered to rise by several ten degrees and in this case, sintering is carried out at a temperature of at least 1300° C. The proportion of the compound such as carbides and the iron group metal used as the binder of diamond in the compact cannot be defined simply, but it is necessary to keep it in such a range that the compound is present as solid, at least, during sintering. For example, when using WC as the compound and Co as the binder metal, WC and Co should be in a quantitative proportion of at least 50% by weight of the former and the balance of the latter.

When a high strength wire rod is drawn by the diamond compact of the present invention, a high pressure is generated on the inner surface of diamond compact die and in particular, where the diamond compact has a small outer diameter and small thickness, it tends to crack sometimes in the longitudinal direction during wire drawing. The longitudinal cracking during wire drawing can be prevented by surrounding the outer circumference of the diamond compact by a support of e.g. cemented carbides and adding pressure thereto from the outer circumference.

The use of the compact according to the present invention includes cutting tools, drill bits and dressers in addition to dies. In these cases, the diamond compact can be bonded to a support of cemented carbide during sintering under ultra-high pressure so as to raise further the toughness of the diamond compact.

However, when a drilling test is carried out using a core bit prepared by bonding the diamond compact of the present invention directly to a WC-Co substrate and brazing the resulting sample to a bit main body, for example, such a problem arises under severer drilling conditions that the diamond compact is stripped from the WC-Co substrate although the compact is not broken. In particular, when the brazing temperature is high, the frequency of stripping is increased. Observing the structure near the bonded part to examine the cause thereof, there is a Co-enriched layer at the boundary of the diamond compact and cemented carbide. In addition, free carbon is found in the cemented carbide near the boundary. The brazing temperature is generally between 750° and 800° C. and it is assumed that diamond is graphitized by Co present in large amount at the boundary to lower the strength and to result in stripping. Furthermore, the presence of free carbon in the cemented carbide alloy decreases the strength thereof, thus resulting in stripping.

The inventors have made studies to obtain a high strength bonding and consequently, have found it effective to use an intermediate layer comprising 70% by volume or less of high pressure form boron nitride and the balance of at least one member of carbides, nitrides and carbonitrides of Group 4a and 5a elements of Periodic Table.

That is to say, a further embodiment of the present invention consists in a composite diamond compact for tools, in which a hard compact comprising 50 to 85% by volume of coarse diamond grains with a grain size of 10 to 100 μm and the balance of a binder consisting of 60 to 90% by volume of ultra-fine diamond grains with a grain size of 1 μm or less, WC powder or (Mo, W)C powder having the same crystal structure as WC, the WC (Mo, W)C powder having a grain size of 1 μm or less, and an iron group metal is bonded to a cermet matrix consisting of WC-Co alloy or carbide crystals of (Mo, W)C type containing Mo as a predominant component bonded by an iron group metal through an intermediate layer with a thickness of 2 mm or less containing 70% by volume or less of high pressure form boron nitride and the balance of at least one member selected from the group consisting of carbides, nitrides, carbonitrides of Group 4a and 5a elements of Periodic Table, and solid solutions and mixtures thereof, optionally with 0.1% by weight or more of at least one member selected from the group consisting of Al, Si and mixtures thereof.

According to our experiments, the diamond compact and cemented carbide alloy substrate are strongly bonded through the intermediate bonding layer under conditions of an ultra-high pressure and high temperature suitable for the production of the diamond compact. In the above described composite compact having the intermediate layer containing high pressure from boron nitride and carbide or nitride, there is not much solvent metal of diamond such as Co flowing out of the cemented carbide substrate at the boundary of the diamond compact layer and intermediate bonding layer and there is a large zone wherein diamond grains and intermediate bonding layer are directly contacted. Accordingly, lowering of the strength due to reheating does not occur. Furthermore, since free carbon is scarcely present in the cemented carbide alloy near the boundary, the bonding strength is high.

According to this embodiment, the diamond compact layer can strongly be bonded to the cemented carbide alloy substrate as described above and this embodiment is very useful for the practice of the present invention. The reason for such a strong bonding can be assumed as follows.

Firstly, as to bonding of the intermediate layer and cemented carbide alloy substrate, carbides or nitrides of Group 4a and 5a elements of Periodic Table contained in the intermediate layer form solid solutions with WC as a predominant component of the cemented carbide alloy substrate and, in addition, high pressure form boron nitride in the intermediate layer reacts with WC-Co as the cemented carbide alloy to form borides, thus resulting in strong bonds.

Secondly, as to bonding of the intermediate layer and diamond compact, diamond powder and iron group metals, carbides or nitrides used as a binder of diamond have a high affinity with carbides or nitrides of Group 4a or 5a elements of Periodic Tables in the intermediate layer, and there is a mixed and sintered layer of the intermediate layer and diamond compact layer since the intermediate layer and diamond compact layer are contacted in powdered form and then sintered, thus resulting in strong bonds.

The sintering property of the intermediate layer itself and the affinity of carbides or nitrides thereof with diamond grains can further be improved by adding 0.1% by weight or more of Al and/or Si to the carbides or nitrides. In particular, the use of TiN as the nitride of Group 4a element of Periodic Table with 0.1% by weight or more of Al is more effective.

The intermediate bonding layer according to the embodiment of the present invention, containing high pressure from boron nitride, has a high heat conductivity, excellent high temperature strength and similar thermal expansion to the diamond compact. If the content of high pressure form boron nitride is more than 70% by volume, the quantity of carbides or nitrides of Group 4a or 5a elements of Periodic Table is less than 30% by volume, the quantity of the solid solutions formed of the carbide or nitride and WC as the predominant component of the cemented carbide alloy substrate are decreased and the borides formed by the reaction of high pressure form boron nitride in the intermediate bonding layer with WC-Co are britlle, thus resulting in tendency of lowering the bonding strength of the intermediate bonding layer and cemented carbide substrate. Therefore, the content of high pressure form boron nitride in the intermediate bonding layer is preferably at most 70% by volume.

As the substrate to be bonded through the intermediate bonding layer, there are cemented carbide of WC-Co or cermets of carbide crystals of (Mo, W)C type containing Mo as a main component, bonded with iron group metals. Since WC-Co or (Mo, W)C-iron group metal substrates have a high rigidity, excellent heat conductivity and good toughness because of containing a metallic binder, these substrates are particularly useful as those of the diamond compacts for drill bits.

The carbides and nitrides used in the intermediate bonding layer of the present invention include, for example, carbides such as TiC, HfN, NbC and TaC, nitrides such as TiN, ZrN, HfN, NbN and TaN, mixtures thereof, and carbonitrides such as Ti(C, N) and Zr(C, N). When using TiN, in particular, the intermediate layer exhibits the best effects.

The above described diamond grains of the present invention can also be used in the diamond compact of this embodiment, but diamond grains of 10 μm or more and fine diamond grains of 1 μm or less, preferably 0.5 μm or less are preferably used. Any of synthetic diamond and natural diamond can be used.

These diamond powders are uniformly mixed with WC or (Mo, W)C powder and an iron group metal powder such as Fe, Co or Ni powder by ball milling, to which boron or boride powder is optionally added. The iron group metal can be dissolved or impregnated during sintering instead of mixing at this stage. Furthermore, the diamond powders can be mixed with WC or (Mo, W)C fine powder and iron group metal powder by ball milling using a pot and balls made of a sintered material of WC or (Mo, W)C and an iron group metal, as previously proposed in our prior patent application (Japanese Patent Application No. 51381/1977). Impregnation of an iron group metal can be carried out by charging mixed powders or diamond powder and WC or (Mo, W)C powder and placing thereon a sheet consisting of one or more of iron group metals, followed by subjecting to an ultra-high pressure and high temperature treatment.

For the production of the compact according to this embodiment, a powder layer of high pressure phase type boron nitride powder and carbide or nitride powder is provided in the form of powder or compact between a cemented carbide alloy substrate and mixed powders for forming a diamond-containing hard layer, or is applied to a cemented carbide substrate in the form of a slurry in a suitable solvent, and the resulting assembly is then subjected to hot pressing at an ultra-high pressure and high temperature, whereby to sinter the diamond-containing hard layer, to sinter the intermediate bonding layer containing the carbide or nitride and to bond the both layers and the intermediate layer to the substrate, at the same time.

The carbides or nitrides of Group 4a or 5a elements of Periodic Table, used in the intermediate bonding layer according to the present invention, are compounds with a high strength, but under a condition of ultra-high pressure, e.g. 20 to 90 kbar for sintering a diamond-containing layer, these compounds are subject to compressing under a pressure near the ideal shearing strength thereof. Thus, these compounds grains are deformed, broken and packed under compacted state, which are capable of giving a dense compact by subsequent heating.

In addition, the diamond powder layer can be impregnated with a melt of catalytic metal for forming diamond or another binder metal under an ultra-high pressure at a high temperature. In the above described marketed diamond compact directly bonded to a cemented carbide substrate, Co, binder metal contained in the cemented carbide substrate enters the diamond powder layer to be a binder metal of the diamond compact. On the contrary, in the present invention, the binder metal can be selected independently of the binder metal of the cemented carbide substrate.

The following examples are given to illustrate the present invention in greater detail without limiting the same.

EXAMPLE 1

Synthetic diamond powder with a grain size of 0.5 μm, WC powder and Co powder were ground and mixed using a pot and balls made of WC-Co cemented carbide alloy to obtain mixed powders with a composition comprising 80% by volume of fine diamond grains with a mean grain size of 0.3 μm, 12% by volume of WC powder and 8% by volume of Co powder, which were then mixed with coarse diamond powder with a grain size of 3-6 μm in a proportion by volume of 4:6. The complete powders were charged in a Ta vessel with an inner diameter of 10 mm and outer diameter of 14 mm, on which a disk of cemented carbide alloy with a composition of WC-10% Co. Then, the vessel was charged in an ultra-high pressure apparatus, to which a pressure of 55 kbar was firstly applied, and then was heated at 1450° C. for 20 minutes. When the Ta vessel was taken, Ta was removed and the structure of the sintered body was observed, diamond grains of 3-6 μm were uniformly dispersed, around each of which there was the binder material containing ultra-fine diamond grains. The workability to be ground of the thus obtained diamond compact and a commercially sold diamond compact of sintered diamond grains with Co was examined. When the workability to be ground by a diamond wheel of the latter was regarded as 100, the workability of the former was 150.

Using these compacts, inserts for cutting were prepared and subjected to a cutting test of Cu alloy under the following conditions:
workpiece Cu alloy round rod with a diameter of 100 mm, cutting speed 300 m/min, depth of cut 0.1 mm, feed 0.02 mm/rev For comparison, a natural diamond tool was subjected to the similar test. The cut surface by the compact of the present invention was similar to that by the natural diamond tool and could be finished like mirror surface. On the contrary, the commercially sold compact gave a surface far from mirror surface.

EXAMPLE 2

Binder powders as shown in Table 1 were prepared using ultra-fine diamond grains having a grain size of 0.3 μm.

TABLE

| Binder No. | Fine Diamond Grain | % by Volume Carbides, Nitrides, Borides of Group 4a, 5a, 6a of Periodic Table | Iron Group Metal |
|---|---|---|---|
| A | 96 | 2 WC | 2 Co |
| B | 90 | 5 WC | 5 Co |
| C | 80 | 10 WC | 10 Co |
| D | 50 | 35 WC | 15 Co |
| E | 20 | 60 WC | 20 Co |
| F | 15 | 55 WC | 30 Co |
| G | 70 | 20 (Mo, W)C | 5 Ni, 5 Co |
| H | 70 | 20 ZrC | 10 Co |
| I | 70 | 20 Ti(C, N) | 10 Co |
| J | 70 | 20 (Ta, Nb) | 10 Ni |
| K | 70 | 20 HfC | 10 Ni |

These binder powders and diamond grains with a grain size of at least 3 μm were mixed in proportions as shown in Table 2 to prepare complete powders.

TABLE 2

| Complete Powder No. | Diamond 3 μm or more Grain Size (μm) | Diamond 3 μm or more Content (vol %) | Binder No. | Binder Content (vol %) | Workability to be Ground | Flank Wear Width (mm) |
|---|---|---|---|---|---|---|
| i | 3-6 | 70 | A | 30 | 160 | broken |
| ii | 3-6 | 70 | B | 30 | 130 | 0.18 |
| iii | 3-6 | 70 | C | 30 | 130 | 0.15 |
| iv | 3-6 | 70 | D | 30 | 140 | 0.20 |
| v | 3-6 | 70 | E | 30 | 170 | 0.23 |
| vi* | 3-6 | 70 | F | 30 | 250 | 0.32 |
| vii | 3-6 | 70 | G | 30 | 135 | 0.18 |
| viii | 3-6 | 70 | H | 30 | 150 | 0.23 |
| ix | 3-6 | 70 | I | 30 | 155 | 0.20 |
| x | 3-6 | 70 | J | 30 | 150 | 0.23 |
| xi | 3-6 | 70 | K | 30 | 150 | 0.20 |
| xii | 6-10 | 60 | C | 40 | 130 | 0.19 |
| xiii* | 1-2 | 60 | C | 40 | 200 | 0.45 |
| xiv* | 6-8 | 90 | C | 10 | 80 | 0.32 |
| xv* | 6-8 | 15 | C | 85 | 250 | 0.50 |
| Marketed Diamond Compact with Diamond Grain Size of 3-6 μm | | | | | 100 | 0.30 |

Note:
*Comparative Sample

These complete powders were sintered and subjected to examination of the workability to be ground by a diamond wheel to obtain results as shown in Table 2. The results are shown by the quantity which can be worked with a specified depth of cut for a specified period of time when the quantity of the marketed diamond compact with a diamond grain size of 3–6 μm, which can be worked under the same conditions, is regarded as "100".

Using these compacts, inserts for cutting were prepared and subjected to a cutting test of cemented carbide alloy under the following conditions:

workpiece WC-15% Co with a diameter of 60 mm, cutting speed 10 m/min, depth of cut 0.2 mm, feed 0.2 mm/rev, cutting time 10 min The results of flank wear width are shown in Table 2.

EXAMPLE 3

The binder powder prepared in Example 1 and diamond powder with a grain size of 3 μm were mixed in proportion by volume of 60:40, charged in a Ta vessel and then sintered at 53 kbar and 1400° C. for 10 minutes. Using the resulting compact, a cutting tool was prepared and then subjected to a cutting test under the following conditions:

workpiece Al-25% Si, cutting speed 300 m/min, depth of cut 0.5 mm, feed 0.2 mm/rev, cutting time 60 min For comparison, the similar test was carried out as to a commercially sold diamond compact of diamond grains of 3–8 μm bonded with Co. Thus, it was found that the compact of the present invention gave a very smooth cut surface with a flank wear width of 0.03 mm, while the comparative compact gave a rough cut surface with a flank wear width of 0.05 mm.

EXAMPLE 4

Synthetic diamond powder with a grain size of 0.5 μm, WC powder and Co powder were ball milled using a pot and balls made of WC-Co cemented carbide alloy to obtain mixed powders with a composition comprising 80% by volume of fine diamond grains with a mean grain size of 0.3 μm, 12% by volume of WC powder and 8% by volume of Co powder, which were then mixed with coarse diamond powder with a grain size of 40 μm in a proportion by volume of 4:6. The complete powders were charged in a vessel of WC-10% Co. Then, the vessel was charged in an ultra-high pressure apparatus, to which a pressure of 55 kbar was firstly applied, and then was heated at 1450° C. for 20 minutes.

Figure 5:
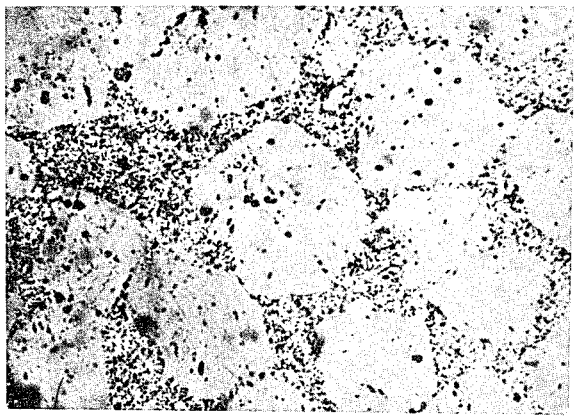
FIGS. 5 (A) and (B) are micrographs showing the structures of the compact of the present invention and the marketed compact with a diamond grain size of 30 to 60 μm respectively.
Figure 5:
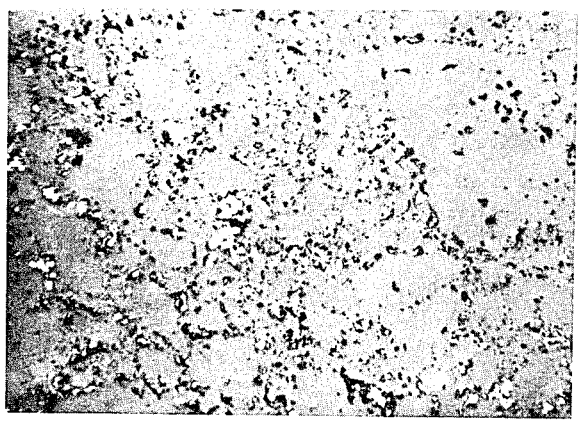

When the sintered body was taken and the structure was observed, the diamond grains of 40 μm in grain size were not bonded with each other and did not form skeleton parts, around each of which there were diamond grains of 0.5 μm and WC-Co as the binder, as shown in FIG. 5 (A). For comparison, a micrograph of the structure of a commercially sold diamond compact consisting of diamond grains with a grain size of 30 to 60 μm bonded with Co is shown in FIG. 5 (B). The two diamond compacts were respectively finished in a die having a hole diameter of 0.175 mm. Using these dies, a brass-plated steel wire was drawn in a lubricant at a linear velocity of 800 m/min. The die formed of the commercially sold diamond compact gave longitudinal scratches on the surface of the wire when 500 kg was drawn, while the compact of the present invention scratched hardly the wire even after drawing 3000 kg.

EXAMPLE 5

Binder powders as shown in Table 3 were prepared using fine diamond powder with a grain size of 0.3 μm.

TABLE 3

| Binder No. | Fine Diamond Grains | % by Volume Carbides, Nitrides, Borides of Group 4a, 5a, 6a of Periodic Table | Iron Group Metal |
|---|---|---|---|
| A | 96 | 2 WC | 2 Co |
| B | 90 | 5 WC | 5 Co |

TABLE 3-continued

| Binder No. | Fine Diamond Grains | % by Volume Carbides, Nitrides, Borides of Group 4a, 5a, 6a of Periodic Table | Iron Group Metal |
| --- | --- | --- | --- |
| C | 80 | 10 WC | 10 Co |
| D | 50 | 35 WC | 15 Co |
| E | 20 | 60 WC | 20 Co |
| F | 15 | 55 WC | 30 Co |
| G | 70 | 20 (Mo, W)C | 5 Ni, 5 Co |
| H | 70 | 20 ZrC | 10 Co |
| I | 70 | 20 Ti(C, N) | 10 Co |
| J | 70 | 20 (Ta, Nb)C | 10 Ni |
| K | 70 | 20 HfB$_2$ | 10 Ni |

These binder powders and diamond grains with a grain size of at least 10 μm were mixed in proportions as shown in Table 4 to prepare complete powders.

TABLE 4

| Complete Powder No. | Diamond Powder of 10 μm or more | | Binder | | Quantity of Drawing (kg) |
| --- | --- | --- | --- | --- | --- |
| | Grain Size (μm) | Content (vol %) | No. | Content (vol %) | |
| i* | 15 | 70 | A | 30 | 500 |
| ii | 15 | 70 | B | 30 | 4000 |
| iii | 15 | 70 | C | 30 | 5500 |
| iv | 15 | 70 | D | 30 | 5000 |
| v | 15 | 70 | E | 30 | 4500 |
| vi* | 15 | 70 | F | 30 | 2000 |
| vii | 15 | 70 | G | 30 | 5300 |
| viii | 15 | 70 | H | 30 | 4100 |
| ix | 15 | 70 | I | 30 | 4000 |
| x | 15 | 70 | J | 30 | 3800 |
| xi | 15 | 70 | K | 30 | 3500 |
| xii | 60 | 60 | D | 40 | 4600 |
| xiii* | 2 | 60 | D | 40 | 2500 |
| xiv* | 30 | 90 | D | 10 | 2600 |
| xv* | 30 | 15 | D | 85 | 1800 |

Note:
*Comparative Sample

These complete powders were sintered and finished in a die with a hole diameter of 0.250 mm in an analogous manner to Example 4. Using these dies, a brass-plated steel wire was drawn in a lubricating oil at a linear velocity of 800 m/min to obtain results as shown in Table 4. For comparison, in the case of two dies made of a commercially sold diamond compact consisting of diamond grains with a grain size of 30-60 μm bonded with Co and a cemented carbide and subjected to the similar test, only 1300 kg and 300 kg were respectively drawn.

EXAMPLE 6

Binder powders as shown in Table 5 were prepared.

TABLE 5

| Binder No. | Diamond Grains of 0.5 μm | % by volume Carbides, Nitrides, Borides of Group 4a, 5a, 6a of Periodic Table | Iron Group Metal |
| --- | --- | --- | --- |
| L | 80 | 5 WC, 5 TiB$_2$ | 5 Ni, 5 Co |
| M | 75 | 5 WC, 10 TiC | 10 Co |
| N | 85 | 5 TiC, 3 ZrN | 7 Ni |
| O | 60 | 10 TaN, 10 TiC | 10 Ni, 10 Co |
| P | 40 | 30 (Mo, W)C, 15 HfB$_2$ | 10 Ni, 5 Co |
| Q | 20 | 50 TiC, 10 VN | 10 Ni, 10 Co |
| R | 80 | 5 TiC, 5 MoC | 5 Ni, 5 Fe |

These binder powders and diamond grains with a grain size of 10 μm or more were mixed in proportions as shown in Table 6 to prepare complete powders, sintered in an analogous manner to Example 4 and finished in dies each having a hole diameter of 1.185 mm and 1.2 mm. Using these dies, a copper-plated steel wire and stainless steel wire were respectively drawn through the die having a hole diameter of 1.185 mm and the die having a hole diameter of 1.2 mm in a lubricating oil and at a linear velocity of 400 m/min. For comparison, a similar test was carried out as to a commercially sold compact consisting of diamond grains with a grain size of 30–60 μm bonded with Co. The results are jointly shown in Table 6.

TABLE 6

| Complete Powder No. | Diamond Powder of 10 μm or more | | Binder | | Wire Drawing (t) | |
| --- | --- | --- | --- | --- | --- | --- |
| | Grain Size (μm) | Content (vol %) | No. | Content (vol %) | Cu-plated Steel Wire | Stainless Steel Wire |
| xvi | 20 | 70 | L | 30 | 120 | 10 |
| xvii | 30 | 60 | M | 40 | 150 | 9 |
| xviii | 50 | 60 | N | 40 | 130 | 8 |
| xix | 10 | 80 | O | 20 | 150 | 10 |
| xx | 60 | 40 | P | 60 | 140 | 7 |
| xxi | 20 | 30 | Q | 70 | 180 | 15 |
| xxii | 20 | 85 | R | 15 | 180 | 12 |
| Commercially Sold Diamond Compact | | | | | 20 | 1 |

EXAMPLE 7

The binder powder prepared in Example 4 and diamond powder with a grain size of 100 μm were mixed in a proportion by volume of 35:65. The resulting complete powders were charged in a vessel made of Ta and subjected to sintering at 55 kbar and 1450° C. for 20 minutes using an ultra-high pressure apparatus. A cutter was made of this sintered body and subjected to a cutting test of granite under conditions of a cutting speed of 30 m/min, depth of cut of 1 mm and feed of 0.5 mm/rev using water as a cutting liquid. For comparison, a similar cutting test was carried out as to a commercially sold diamond compact for a drill bit, consisting of diamond grains with a grain size of about 100 μm bonded with Co. Thus, it was found that the edge of the compact according to the present invention was hardly broken even after cutting for 60 minutes, while the edge of the commercially sold compact was broken after cutting for 10 minutes.

EXAMPLE 8

The binder powder prepared in Example 4 and diamond powder with a grain size of 3 μm were mixed in a proportion of 60:40 by volume, charged in a Ta vessel and then sintered at 53 kbar and 1400° C. Using the resulting compact, a cutting tool was prepared and then subjected to a cutting test under the following conditions:

workpiece Al-25% Si, cutting speed 300 m/min, depth of cut 0.5 mm, feed 0.2 mm/rev, cutting time 60 minutes For comparison, the similar test was carried out as to a commercially sold diamond compact consisting of diamond grains with a grain size of 3–8 μm, bonded with Co. Thus, it was found that the compact of the present invention gave a very smooth cut surface with a flank wear width of 0.03 mm, while the commercially sold compact gave a rough cut surface with a flank wear width of 0.05 mm.

EXAMPLE 9

Using the binder powders B, C, D, E and F prepared in Example 5, complete powders as shown in Table 7 were prepared.

TABLE 7

| Complete Powder No. | Diamond Powder of 10 μm or more | | Binder | | Cutting Test Result of Andesite |
|---|---|---|---|---|---|
| | Grain Size (μm) | Content (vol %) | No. | Content (vol %) | |
| xxiii | 80 | 70 | B | 30 | no breakage, little wearing |
| xxiv | 50 | 70 | B | 30 | no breakage, little wearing |
| xxv | 80 | 60 | C | 40 | no breakage, little wearing |
| xxvi | 80 | 80 | D | 20 | no breakage, little wearing |
| xxvii* | 2 | 70 | E | 30 | no breakage, much wearing |
| xxviii* | 80 | 70 | F | 30 | no breakage, much wearing |
| Commercially Sold Diamond Compact for Drilling | | | | | broken in 5 min |

Note:
*Comparative Sample

After placing a disk of WC-10% Co in a vessel of Mo, these complete powders were charged therein and sintered under an ultra-high pressure in an analogous manner to Example 4. Any of the diamond compacts were bonded to the WC-Co cemented carbide alloy.

To examine the usefulness of these diamond compacts for drill bit, cutting tools were made of them and subjected to cutting test by wet process for 30 minutes under the following conditions:

workpiece andesite with a compressive strength of 1400 kg/cm$^2$, cutting speed 45 m/min, depth of cut 0.5 mm, feed 0.2 mm/rev.

For comparison, the similar test was carried out as to a commercially sold diamond compact consisting of diamond grains with a grain size of 100 μm bonded with Co. The results are jointly shown in Table 7.

EXAMPLE 10

Synthetic diamond powder with a grain size of 0.5 μm, WC powder and Co powder were ball milled using a pot and balls made of WC-Co cemented carbide alloy to obtain mixed powders with a composition comprising 80% by volume of fine diamond grains with a mean grain size of 0.3 μm, 12% by volume of WC powder and 8% by volume of Co powder, which were then mixed with coarse diamond powder with a grain size of 20 to 30 μm in a proportion by volume of 75:25. The complete powders were charged in a Mo vessel. Then, the vessel was charged in an ultra-high pressure apparatus, to which a pressure of 55 kbar was firstly applied, and then heated at 1450° C. for 30 minutes.

Figure 8:
FIGS. 8 (A) and (B) are respectively SEM photographs (magnification: 30 times and 500 times) of the edge of the compact according to the present invention after rock cutting.
Figure 8:
Figure 9:
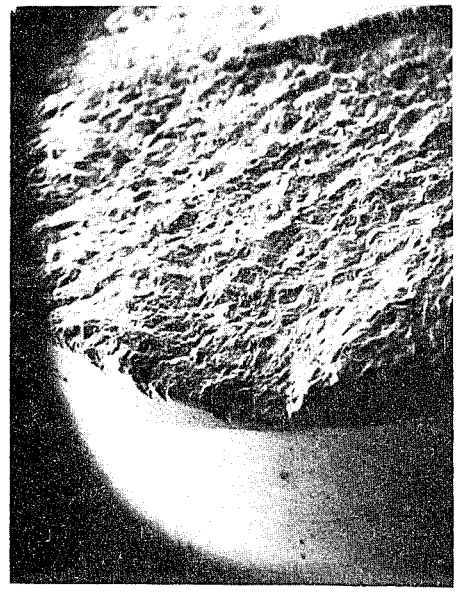
FIGS. 9 (A) and (B) are respectively SEM photographs (magnification: 30 times and 500 times) of the edge of the commercially sold diamond compact for a drill bit after rock cutting.
Figure 9:
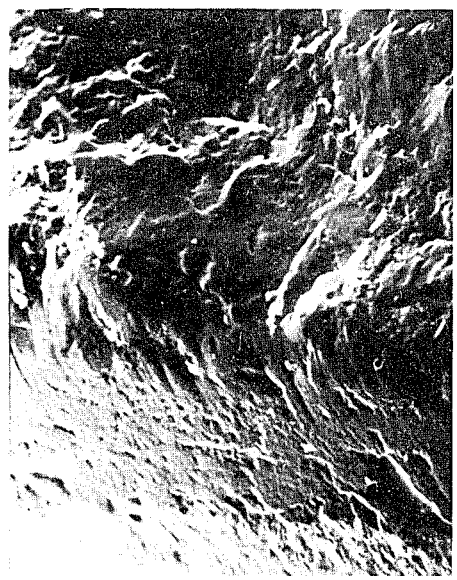

When the sintered body was taken out of the apparatus and the structure was observed, it was found that the diamond grains with a grain size of 20 to 30 μm were bonded through the binder containing ultra-fine diamond grains. A cutting tool was made by grinding this compact and subjected to a cutting test using a shaper for 1 hour under the following conditions:

workpiece andesite with a compressive strength of 1500 kg/cm$^2$, cutting speed 20 m/min, depth of cut 1 mm, feed 0.4 mm/rev For comparison, another cutting tool was made of a commercially sold diamond compact for a drill bit and subjected to the test at the same time. Photographs after the cutting test are shown in FIG. 8 and FIG. 9. As shown in FIGS. 8 (A) and (B), the compact of the present invention gave no breakage of edge but showed a little wear, while as shown in FIGS. 9 (A) and (B), the commercially sold compact showed a large breakage of edge.

EXAMPLE 11

Binder powders as shown in Table 8 were prepared using ultra-fine diamond grains with a grain size of 0.3 μm.

TABLE 8

| Binder No. | Fine Diamond Grains | % by volume WC or (Mo, W)C | Iron Group Metal |
|---|---|---|---|
| A | 95 | 2.5 WC | 2.5 Co |
| B | 90 | 5 WC | 5 Co |
| C | 80 | 10 (Mo, W)C | 5 Co - 5 Ni |
| D | 70 | 20 WC | 10 Co |
| E | 60 | 30 WC | 10 Co |
| F | 50 | 40 WC | 10 Co |

These binder powders and diamond grains with a grain size of at least 5 μm were mixed in proportions as shown in Table 9 to prepare complete powders.

TABLE 9

| Complete Powder No. | Diamond Powder of 10 μm or more | | Binder | | Cutting Test Result of Granite, Flank Wear Width (mm) |
|---|---|---|---|---|---|
| | Grain Size (μm) | Content (vol %) | No. | Content (vol %) | |
| i | 20–30 | 75 | A | 25 | broken in 15 min |
| ii | 20–30 | 80 | B | 20 | 0.51 |
| iii | 20–30 | 80 | C | 20 | 0.28 |
| iv | 20–30 | 70 | D | 30 | 0.50 |
| v | 20–30 | 75 | E | 25 | 0.53 |
| vi | 20–30 | 75 | F | 25 | 0.95 |
| vii | 5–9 | 75 | C | 25 | 0.98 |
| viii | 10–20 | 75 | C | 25 | 0.37 |
| ix | 40–60 | 75 | C | 25 | 0.30 |
| x | 80–100 | 75 | C | 25 | 0.45 |
| xi | 150–200 | 75 | C | 25 | broken in 45 min |
| xii* | 20–30 | 90 | C | 10 | broken in 50 min |
| xiii | 20–30 | 85 | C | 15 | 0.33 |
| xiv | 20–30 | 50 | C | 50 | 0.60 |
| xv | 20–30 | 40 | C | 60 | 0.99 |

Note:
*Comparative Example

These complete powders were sintered in a similar monner to Example 10. Cutting tools were made of the resulting compacts and then subjected to a cutting test of granite using a shaper for 120 minutes under the following conditions:

Cutting speed 30 m/min, depth of cut 1 mm, feed 0.3 mm/rev

The results are jointly shown in Table 9.

EXAMPLE 12

Diamond powder with a mean grain size, WC powder, Co powder and B powder were ball milled using a pot and balls made of WC-Co cemented carbide alloy to obtain mixed powders with a composition comprising 81% by volume of fine diamond particles with a mean particle size of 0.3 μm, 10% by volume of WC powder, 9% by volume of Co powder and 1.0% by volume of B powder, which were then mixed with coarse diamond powder with a particle size of 30-40 μm in a proportion by volume of 2:8 to prepare complete powders. The content of B measured was 0.128% by weight.

The resulting complete powders were sintered in an analogous manner to Example 10. Using the compact, a core bit having three cutters and an outer diameter of 50 mm was prepared and subjected to drilling of andesite at a rate of 20 m/min. For comparison, core bits were made of the same compact as described above but free from B and a commercially sold diamond compact for a drill bit and subjected to the drilling test. The B-containing compact of the present invention and the B-free compact were capable of drilling 20 m. On the other hand, the core bit of the commercially sold compact met with breakage of the edge when the depth of drilling reached 6 m.

When using $TiB_2$, $ZrB_2$, $HfB_2$ or $B_4C$ instead of the B, similar results were obtained.

EXAMPLE 13

Diamond powder with a mean grain size of 0.3 μm and WC powder were mixed in a proportion by volume of 9:1. The mixed powders were further mixed with diamond grains with a grain size of 30-40 μm in a proportion by volume of 1:3 to prepare complete powders, charged in a vessel of cemented carbide alloy, on which a Co plate was covered, and then subjected to sintering in an ultra-high pressure and high temperature apparatus.

When the thus sintered body was taken out of the apparatus and the structure was viewed, Co permeated uniformly to sinter the diamond grains. A die with an inner diameter of 0.25 mm was made of the resulting diamond compact and subjected to drawing of a brass-plated steel wire at a linear velocity of 800 m/min. For comparison, another die was made of a commercially sold diamond compact consisting of diamond grains of 30 to 40 μm and was similarly tested. Consequently, the die of the compact of the present invention showed a wire drawing of 5.3 t, but that of the commercially sold compact showed only a wire drawing of 2 t.

EXAMPLE 14

Diamond grains with a grain size of 40-60 μm were mixed with the binder powder prepared in Example 12 in a proportion by volume of 4:1, charged in a vessel made of Mo and sintered in an analogous manner to Example 12. A dresser was made of the resulting compact and subjected to dressing of a wheel of SiC 200 times. For comparison, another dresser was made of a commercially sold compact consisting of diamond grains with a grain size of 40-60 μm and was similarly tested. Consequently, the compact of the present invention showed a flank wear width of 0.31 mm, while the commercially sold compact showed that of 0.53 mm.

EXAMPLE 15

Synthetic diamond powder with a grain size of 0.5 μm, WC powder and Co powder were ball milled using a pot and balls made of WC-Co cemented carbide to obtain mixed powders with a composition comprising 80% by volume of fine diamond grains with a mean grain size of 0.3 μm, 12% by volume of WC powder and 8% by volume of Co powder, which were then mixed with coarse diamond powder with a grain size of 20-30 μm in a proportion by volume of 75:25. To the mixed powders was added 0.15% by weight of B powder.

Onto the upper surface of a cemented carbide alloy of WC-6% Co having an outer diameter of 10 mm and a height of 3 mm was coated a slurry of a mixture comprising 60% by volume of cubic boron nitride (CBN) powder and the balance of TiN powder containing 20% by weight of Al in an organic solvent (polyvinyl alcohol) containing ethyl cellulose. This cemented carbide was placed in a vessel of Mo in which the diamond-containing hard layer powder was charged so as to be contacted with the cubic boron nitride-containing intermediate layer. Then, the vessel was charged in an ultra-high pressure apparatus, to which a pressure of 55 kbar was firstly applied, and then heated at 1500° C. for 20 minutes.

When the resulting sintered body was taken out of the apparatus after cooling and the structure was observed, it was found that the diamond grains with a grain size of 20-30 μm were bonded through the binder containing the ultra-fine diamond grains and at the bonding boundary, the diamond compact was strongly bonded to the cemented carbide alloy through the intermediate layer containing the cubic boron nitride.

A core bit having four cutters and an outer diameter of 46 mm was made of this composite compact and subjected to drilling of andesite having a compressive strength of 1800 kg/cm² at a speed of 250 rev/min with a bit load of 800 kg. For comparison, other core bits were made on an experimental basis using a commercially sold diamond compact for a bit and the same diamond compact as described above but free from the intermediate layer and were similarly tested. Consequently, the core bit of the compact of the present invention met with no breakage and was resistant to further use even after drilling of 20 m, while the core bit of the commercially sold compact met with breakage and peeling of the diamond compact when the depth of drilling reached 5 m. In the core bit of the compact having the same hard layer as the compact of the present invention but having no intermediate layer, the diamond compact was stripped from the cemented carbide alloy when the depth of drilling reached 15 m.

EXAMPLE 16

Binder powders as shown in Table 10 were prepared using fine diamond powder with a grain size of 0.3 μm.

TABLE 10

| Binder No. | Fine Diamond Grains | Content (% by volume) WC or (Mo, W)C | Iron Group Metal |
| --- | --- | --- | --- |
| A | 95 | 2.5 WC | 2.5 Co |
| B | 90 | 5 WC | 5 Co |
| C | 80 | 10 (Mo, W)C | 5 Co - 5 Ni |
| D | 70 | 20 WC | 10 Co |
| E | 60 | 30 WC | 10 Co |

TABLE 10-continued

| Binder No. | Fine Diamond Grains | Content (% by volume) WC or (Mo, W)C | Iron Group Metal |
|---|---|---|---|
| F | 50 | 40 WC | 10 Co |

These binder powders and diamond grains with a grain size of at least 10 μm were mixed in proportions as shown in Table 11 to prepare complete powders.

TABLE 11

| Complete Powder No. | Diamond Powder of 10 μm or more | | Binder | |
|---|---|---|---|---|
| | Grain Size (μm) | Content (vol %) | No. | Content (vol %) |
| i | 20–30 | 70 | A | 25 |
| ii | 20–30 | 80 | B | 20 |
| iii | 20–30 | 80 | C | 20 |
| iv | 20–30 | 70 | D | 30 |
| v | 20–30 | 75 | E | 25 |
| vi | 20–30 | 75 | F | 25 |
| vii | 5–9 | 75 | C | 25 |
| viii | 10–20 | 75 | C | 25 |
| ix | 40–60 | 75 | C | 25 |
| x | 80–100 | 75 | C | 25 |
| xi | 150–200 | 75 | C | 25 |
| xii | 20–30 | 90 | C | 10 |
| xiii | 20–30 | 85 | C | 15 |
| xiv | 20–30 | 50 | C | 50 |
| xv | 20–30 | 40 | C | 60 |

Then, powders for intermediate layers as shown in Table 12 were prepared.

TABLE 12

| No. | Type | High Pressure Form Boron Nitride Grain Size (μm) | Content (vol %) | Binder Carbides, Nitrides, Carbonitrides of Group 4a, 5a (vol %) | Other Additives (wt %) |
|---|---|---|---|---|---|
| a | CBN | 2–6 | 80 | 80 TiN | 20 Al |
| b | CBN | 2–6 | 70 | 80 TiN | 20 Al |
| c | CBN | 1 or less | 60 | 40 TiN, 30 ZrN | 30 Al |
| d | WBN | 0.1 or less | 50 | 70 Ti(C, N) | 20 Al, 10 Si |
| e | CBN | 5–10 | 30 | 60 HfN, 10 TiC | 30 Al |
| f | CBN | 5–10 | 10 | 50 TiN, 40 TaC | 10 Al |
| g | CBN | 2–6 | 5 | 30 NbN, 10 VN, 30 ZrN | 30 Si |

Note:
CBN Cubic Type Boron Nitride
WBN Wurtzite Type Boron Nitride

These intermediate layer powders were respectively added to an organic solvent containing ethyl cellulose to form a slurry and coated onto a cemented carbide alloy of WC-8% Co. This cemented carbide alloy was charged in a vessel of Mo and each of the diamond-containing powders shown in Table 11 was charged so as to be contacted with the intermediate layer powder. The assembly was sintered under an ultra-high pressure in an analogous manner to Example 15 to form a diamond compact and a core bit having three cutters was made of the resulting diamond compact. In Table 13 are shown the diamond compacts and intermediate layers made on an experimental basis. These bits were subjected to drilling test of andesite with a monoaxial compressive strength of 2000 kg/cm$^2$ at a rate of 50 m/min to effect a drilling of 10 m. The test results are also shown in Table 13.

TABLE 13

| No. | Diamond Compact-forming Powder | Intermediate Layer | Drilling Test Result |
|---|---|---|---|
| I | i | a | stripping by 1 m |
| II | i | b | broken by 1.5 m |
| III | ii | a | stripping by 1.3 m |
| IV | ii | b | drilling of 10 m |
| V | iii | c | drilling of 10 m |
| VI | iv | d | drilling of 10 m |
| VII | v | e | drilling of 10 m |
| VIII | vi | b | much worn by 3 |
| IX | vii | b | much worn by 2.5 m |
| X | viii | f | drilling of 10 m |
| XI | ix | g | drilling of 10 m |
| XII | x | c | drilling of 10 m |
| XIII | xi | c | broken by 2.3 m |
| XIV | xii | b | broken by 2.5 m |
| XV | xiii | b | drilling of 10 m |
| XVI | xiv | d | drilling of 10 m |
| XVII | xv | e | much worn by 2.7 m |

Example 17

A diamond compact was made on an experimental basis and a core bit having four cutters was made of the diamond compact in an analogous manner to Example 15 except changing the cemented carbide alloy of WC-6% Co to (Mo, W)C-10% Ti, 10% Co. When andesite with a monoaxial compressive stength of 1700 kg/cm$^2$ was drilled at a speed of 100 m/min by 20 m using the resulting bit, there was found no breakage, nor stripping in the diamond compact of the present invention.

What is claimed is:

1. A diamond compact for a tool, comprising 20 to 85% by volume of diamond grains with a grain size of at least 3 μm and the balance of a binder said binder consisting of (1) 20 to 95% by volume of ultra-fine diamond grains with a grain size of at most 1 μm, (2) at least one member with a grain size of at most 1 μm, selected from the group consisting of carbides, carbonitrides, nitrides, borides of Group 4a, 5a and 6a elements of Periodic Table, solid solutions thereof and mixed crystals thereof and (3) at least one member selected from the group consisting of iron group metals.

2. The diamond compact for a tool as claimed in claim 1, wherein the diamond grains have a grain size of 3 to 10 μm.

3. The diamond compact for a tool as claimed in claim 1, wherein the diamond grains have a grain size of at least 10 μm.

4. The diamond compact for a tool as claimed in claim 1 or claim 3, wherein the diamond grains have a grain size of 10 to 100 μm.

5. The diamond compact for a tool as claimed in claim 1, wherein the carbides are WC and (Mo, W)C having the same crystal structure as WC.

6. The diamond compact for a tool as claimed in claim 1, wherein the carbide and iron group metal are in such a proportion that the content of the carbide is more than that corresponding to the eutectic composition.

7. The diamond compact for a tool as claimed in claim 1, wherein the ultra-fine diamond grains have a grain size of at most 0.5 μm.

8. The diamond compact for a tool as claimed in claim 1 wherein a, therein the sintered body of the diamond grains and binder is supported by a substrate of cemented carbide alloy.

9. The diamond compact for a tool as claimed in claim 8, wherein the supporting is carried out through an intermediate layer having a thickness of at most 2 mm and containing at most 70% by volume of high pressure form boron nitride selected from the group of cubic type boron nitride and Wurtzite type boron nitride and the balance of at least one member selected from the group consisting of carbides, nitrides, and carbonitrides of Group 4a and 5a elements of Periodic Table, solid solutions thereof and mixtures thereof.

10. The diamond compact for a tool as claimed in claim 9, wherein the intermediate layer further contains at least 0.1% by weight of at least one member selected from the group consisting of Al, Si and mixtures thereof.

11. The diamond compact for a tool as claimed in claim 8, wherein the cemented carbide alloy is selected from the group consisting of WC-Co alloys and (Mo, W)C type crystals containing Mo as a predominant component, bonded by an iron group metal.

12. A diamond compact for a tool, comprising 50 to 85% by volume of coarse diamond grains with a grain size of 10 to 100 μm and the balance of a binder said binder consisting of (1) 60 to 90% by volume of ultra-fine diamond grains with a grain size of at most 1 μm, (2) WC or (Mo, W)C having the same crystal structure as WC, with a grain size of at most 1 μm and (3) an iron group metal.

13. The diamond compact for a tool as claimed in claim 12, wherein the compact contains further 0.005 to 0.15% by weight of at least one of boron and boron-containing compounds.

14. The diamond compact for a tool as claimed in claim 13, wherein the boron-containing compounds are $TiB_2$, $ZrB_2$, $HfB_2$, $B_4C$ and mixtures thereof.

15. The diamond compact for a tool as claimed in claim 12, wherein WC or (Mo, W)C and the iron group metal are in such a proportion that the content of the carbide is more than that corresponding to the eutectic composition.

16. A process for the production of a diamond compact for a tool, comprising 20 to 85% by volume of diamond grains with a grain size of at least 3 μm and the balance of a binder said binder consisting of (1) 20 to 95% by volume of ultra-fine diamond grains with a grain size of at most 1 μm, (2) at least one member with a grain size of at most 1 μm, selected from the group consisting of carbides, carbonitrides, nitrides, borides and Group 4a, 5a and 6a elements of Periodic Table, solutions thereof and mixed crystals thereof and (3) at least one member selected from the group consisting of iron group metals, which comprises preparing a mixture of diamond powder with a grain size of at least 3 μm, ultra-fine diamond powder with a grain size of at most 1 μm, at least one member with a grain size of at most 1 μm, selected from the group consisting of carbides, carbonitrides, nitrides, borides of Group 4a, 5a and 6a elements of Periodic Table, solid solutions thereof and mixed crystals thereof and at least one of iron group metal powders and subjecting the mixture to hot pressing at a high temperature and high pressure at which diamond is stable using an ultra-high pressure and high temperature apparatus.

17. The process for the production of a diamond compact for a tool as claimed in claim 16, wherein the diamond powder has a grain size of 3 to 10 μm.

18. The process for the production of a diamond compact for a tool as claimed in claim 16, wherein the diamond powder has a grain size of at least 10 μm and the ultra-fine diamond powder has a grain size of at most 0.5 μm.

19. The process for the production of a diamond compact for a tool as claimed in claim 16 or claim 18, wherein the diamond powder has a grain size of 10 to 100 μm.

20. The process for the production of a diamond compact for a tool as claimed in claim 16, wherein the carbides are WC and (Mo, W)C having the same crystal structure as WC.

21. The process for the production of a diamond compact for a tool as claimed in claim 16, wherein the mixture containing the carbide and iron group metal in such a proportion that the content of the carbide is more than that corresponding to the eutectic composition is used, and grain growth of the ultra-fine diamond powder is inhibited above a temperature at which the eutectic of the carbide and iron group metal is formed.

22. A process for the production of a diamond compact for a tool, comprising 50 to 80% by volume of coarse diamond grains with a grain size of 10 to 100 μm and the balance of a binder said binder consisting of (1) 60 to 90% by volume of ultra-fine diamond grains with a grain size of at most 1 μm, (2) WC or (Mo, W)C having the same crystal structure as WC, with a grain size of at most 1 μm and (3) an iron group metal, which comprises preparing a mixture of diamond powder with a grain size of 10 to 100 μm, ultra-find diamond powder with a grain size of at most 1 μm, WC or (Mo, W)C powder with a grain size of at most 1 μm, the latter having the same crystal structure as the former, and an iron group metal and then subjecting the mixture to hot pressing at a high pressure and high temperature at which diamond is stable using an ultra-high pressure and high temperature apparatus.

23. The process for the production of a diamond compact for a tool as claimed in claim 22, wherein the prepared mixture prior to heat pressing further contains 0.005 to 0.15% by weight of at least one of boron and boron-containing compounds.

24. The process for the production of a diamond compact for a tool as claimed in claim 22, wherein an alloy plate consisting of at least one of iron group metals is placed on a mixed powders of diamond powder with a grain size of 10 to 100 μm, ultra-fine diamond powder with a grain size of at most 1 μm and WC or (Mo, W)C powder with a grain size of at most 1 μm, and subjected to hot pressing in an ultra-high pressure and high temperature apparatus using a solid pressure medium.

25. The process for the production of a diamond compact for a tool as claimed in claim 24, wherein the mixed powders further contain 0.005 to 0.15% by weight of at least one of boron and boron-containing compounds.

26. The process for the production of a diamond compact for a tool as claimed in any one of claims 22 to 25, wherein the mixture containing WC or (Mo, W)C having the same crystal structure as WC and an iron group metal in such a proportion that the content of the carbide is more than that corresponding to the eutectic composition is used as a part of the binder components and grain growth of the ultra-fine diamond powder is inhibited above a temperature at which the eutectic of the carbide and iron group metal is formed.

27. A process for the production of a diamond compact tool, which comprises providing an intermediate layer consisting of a mixture of high pressure form boron nitride selected from the group of cubic type boron nitride and Wurtzite type boron nitride and at least one member selected from the group consisting of carbides, nitrides and carbonitrides of Group 4a and 5a elements of Periodic Table, solid solutions thereof and mixtures thereof on a substrate of WC-Co alloy or a cermet substrate of carbide crystals of (Mo, W)C type bonded by an iron group metal, charging on the intermediate layer mixed powders of 20 to 85% by volume of diamond grains with a grain size of at least 3 μm and the balance of a mixture of (1) 20 to 95% by volume of the mixture of ultra-fine diamond grains with a grain size of at most 1 μm, (2) at least one member with a grain size of at most 1 μm, selected from the group consisting of carbides, carbonitrides, nitrides, borides of Group 4a, 5a and 6a elements of Periodic Table, solid solutions thereof and mixed crystals thereof and (3) an iron group metal powder, hot pressing the assembly at a high temperature and high pressure at which diamond is stable using an ultra-high pressure and high temperature apparatus, and thereby sintering the diamond-containing hard layer powder and intermediate layer powder and simultaneously bonding to the substrate.

28. The process for the production of a diamond compact for a tool as claimed in claim 27, wherein the intermediate layer is provided by placing the mixture for the intermediate layer in the form of a powder or a compact on the substrate or by applying or coating the mixture onto the substrate.

29. The process for the production of a diamond compact for a tool as claimed in claim 27 or claim 28, wherein the mixture for the intermediate layer contains further at least 0.1% by weight of at least one member selected from the group consisting of Al, Si and mixtures thereof.

30. The process for the production of a diamond compact for a tool as claimed in claim 27, wherein diamond grains with a grain size of 10 to 100 μm are contained in a proportion of 50 to 85% by volume and ultra-fine diamond grains with a grain size of at most 1 μm are contained in a proportion of 60 to 90% by volume.

31. The process for the production of a diamond compact for a tool as claimed in claim 27, wherein the carbides for the hard layer are WC and (Mo, W)C having the same crystal structure as WC.

32. The process for the production of a diamond compact for a tool as claimed in claim 31, wherein the mixed powders charged on the intermediate layer further contain 0.005 to 0.15% by weight of at least one of boron and boron-containing compounds.

33. The process for the production of a diamond compact for a tool as claimed in claim 27 wherein an alloy plate consisting of at least one of iron group metals is placed on mixed powders of 20 to 85% by volume of diamond grains with a grain size of at least 3 μm and the balance of a mixture of (1) 20 to 95% by volume of the mixture of ultra-fine diamond grains with a grain size of at most 1 μm and (2) at least one member with a grain size of at most 1 μm, selected from the group consisting of carbides, carbonitrides, nitrides and borides of Group 4a, 5a and 6a elements of Periodic Table, solid solutions thereof and mixed crystals thereof.

34. The process for the production of a diamond compact for a tool as claimed in claim 27, wherein the carbide and iron group metal in the mixed powders for the hard layer are in such a proportion that the content of the carbide is more than that corresponding to the eutectic composition.

35. The process for the production of a diamond compact for a tool as claimed in claim 27, wherein the nitride in the mixture for the intermediate layer is TiN.

* * * * *